Aug. 21, 1951 W. R. PARRISH 2,564,921
METHOD OF MAKING FISHING POLE JOINTS
Filed June 26, 1948
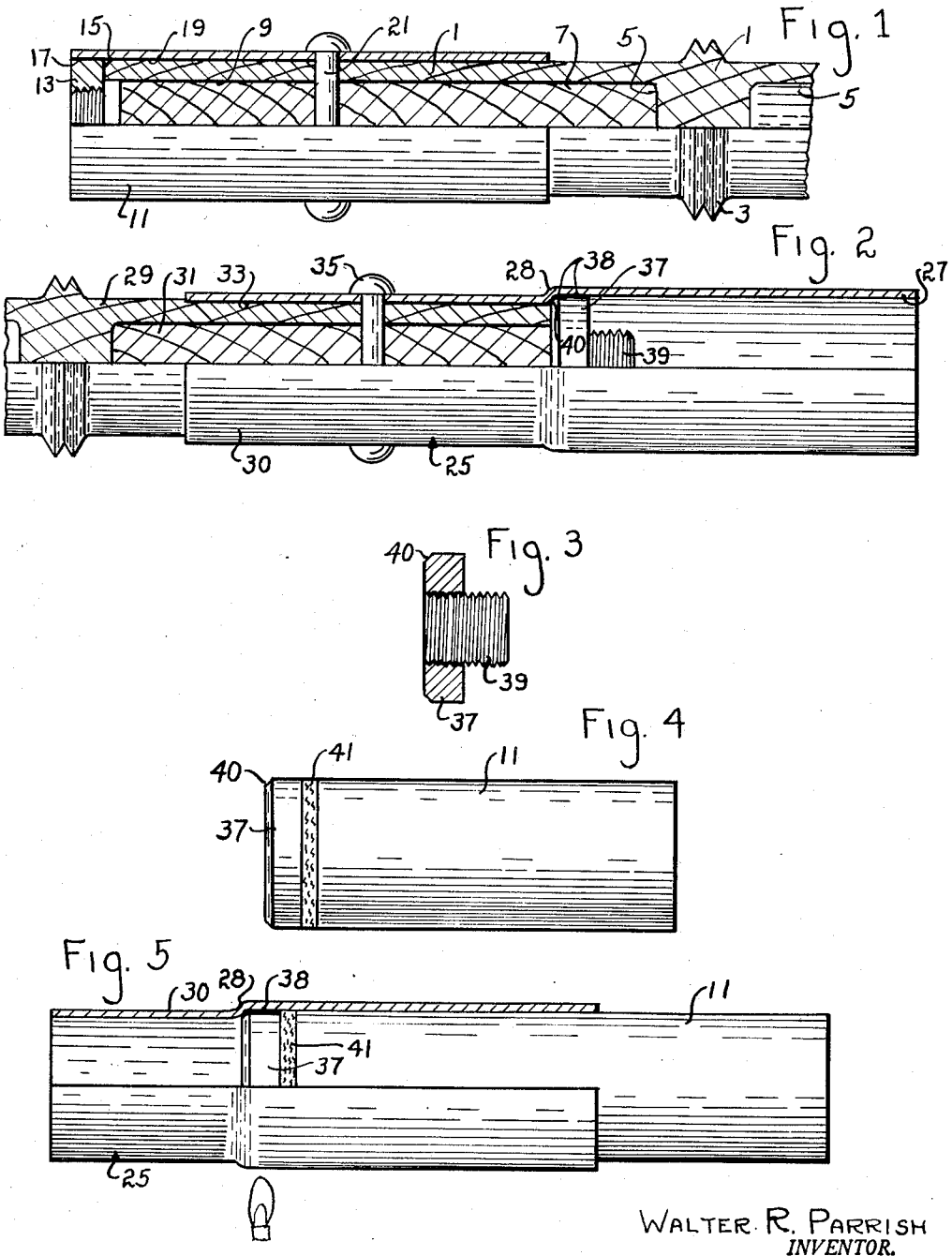
WALTER R. PARRISH
INVENTOR.
BY Edmund W. E. Kamm
ATTORNEY Patented Aug. 21, 1951

2,564,921

UNITED STATES PATENT OFFICE 2,564,921

METHOD OF MAKING FISHING POLE JOINTS

Walter R. Parrish, Fort Wayne, Ind.

Application June 26, 1948, Serial No. 35,342

7 Claims. (Cl. 29—148)

This invention relates to a fishing pole joint. More specifically, it relates to a fishing pole joint which is screwed together and to a method for making such a joint.

It is an object of the invention to provide a joint which is rigid and strong.

Another object of the invention is to provide a joint in which the mating parts are perfectly centered so that it will go together easily.

Still another object of the invention is to provide means for preventing splitting of the cane portions of the pole.

Yet another object is to provide protection for the male portion of the screwed connection.

These and other objects will become apparent from a study of this specification and the drawings which are attached hereto and are made a part hereof, and in which:

Figure 1 is a view partly in section showing the plug ferrule section.

Figure 2 is a view partly in section showing the socket ferrule section.

Figure 3 is a sectional view showing the screw member.

Figure 4 is an elevation showing the assembly preparatory to placing the screw member.

Figure 5 shows the method of fixing the screw member in place.

The joint

Referring now to Figure 1, the numeral 1 represents a section of cane which has the node 3 and is hollow as shown at 5. A wooden plug 7 is held in the hollow end portion by glue 9.

A cylindrical plug ferrule 11 has a cylindrical nut 13 fitted in the end thereof. The nut is preferably chamfered at 15 and soldered at 17 to the ferrule and flush with the end thereof.

The plugged end of the cane is then inserted in the open end of the ferrule and is glued therein as at 19. A rivet 23 is inserted in a hole 21 through the ferrule, cane and plug and riveted in place.

A socket ferrule 25 comprises an expanded bell section 27 which slidably and rotatably receives the plug section and is connected by neck 28 to the smaller section 30. The small end of the ferrule receives a cane 29 which is also fitted with a plug 31 and which is glued in the ferrule at 33 and pinned with rivet 35.

A cylindrical nut 37 having a stud 39 soldered therein at 38 is soldered in place, preferably adjacent the neck 28.

The joint is put together by inserting the plug member 1 into the bell 27 of the socket member 25 to guide the threaded hole of the nut 13 to the stud 39, after which the members are rotated relatively in opposite directions into full engagement.

The joint thus assembled is strong and cannot come apart as the result of whipping of the pole during use.

Further, the threaded portions are protected when the pole is not assembled. The plugs 7 and 31 and the glue prevent the cane from splitting in use or due to the insertion of the rivets.

Method of making

In order to insure proper manufacture of the device, I prefer to chamfer the edge 15 of nut 13 which is disposed inside the ferrule 11. I apply a ring of hard solder, preferably silver solder, at the chamfer and by heating the end of the ferrule, sweat the solder between the contiguous surfaces of the nut and ferrule.

Next I sweat one end of the stud 39 in the nut 37 with the stud extending from the side of the nut opposite chamfer 40 (Fig. 3).

Thereafter, I place an asbestos washer 41 on the stud and screw it into the nut 13. A ring of silver solder is placed on the chamfer 40 or the solder is otherwise introduced in bell 27 and the assembly is forced into the bell until the nut 37 strikes the neck 28. A gas flame or other heating medium is then applied at the neck to sweat the solder between nut 37 and ferrule 25.

After the parts have cooled, I leave them assembled and pour some glue or cement into the open end of ferrule 11 and force the cane 1 into position therein, drill the hole 21 and place rivet 23. The glue will fill all voids and will exude from the joint so that the excess can be wiped away.

The joint is then taken apart and cane 29 is similarly glued and riveted in the end 30 of ferrule 25.

The washer is removed and the joint is complete. The washer prevents the faces of nuts 37 and 13 from being soldered together and also reduces the transmission of heat to the joint between nut 13 and ferrule 11 so that this will not become unsoldered.

It will be seen that the concentricity of stud 39, hole in nut 13 and ferrules 11 and 25 will thus be assured and the joint will, as a result, be easy to assemble and take apart.

The joint will be solid and strong and the plugging and gluing of the cane will prevent splitting thereof in use.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. The method of making a fishing pole joint comprising the steps of cementing a plug in the hollow end of a section, pouring cement into a ferrule having a transverse wall and forcing the plugged end of the section into said ferrule to cause said cement to be forced between the section and ferrule.

2. The method of making a fishing pole joint having telescopic ferrules comprising the steps of forming an inner ferrule terminating in a coaxial nut, placing a heat resistant washer on the nut and inserting a screw therein having a head adapted to fit the outer ferrule, thereafter telescoping said ferrules and fixing said head in the outer ferrule by soldering the head and ferrule.

3. The method of making a fishing pole joint having telescopic ferrules comprising the steps of soldering a cylindrical nut at the end of the inner ferrule, forming a screw, soldering the screw in a second cylindrical nut adapted to fit the outer ferrule, assembling the screw in the first named nut, telescoping the ferrules and soldering the last named nut in the outer ferrule.

4. The method of making a fishing pole joint having telescopic ferrules comprising the steps of soldering a cylindrical nut at the end of the inner ferrule, forming a screw, soldering the screw in a second cylindrical nut adapted to fit the outer ferrule, assembling the screw with a heat resistant washer thereon, in the first named nut, telescoping the ferrules and soldering the last named nut in the outer ferrule.

5. The method of making a fishing pole joint having telescopic ferrules comprising the steps of forming an inner ferrule terminating in a coaxial nut, inserting a screw therein having a head adapted to fit the outer ferrule, thereafter telescoping said ferrules and fixing said head in the outer ferrule, placing a fluid cement in the open end of the inner ferrule and forcing a pole section therein whereby cement will be forced between the section and ferrule and out of the open end thereof.

6. The method of making a fishing pole joint having telescopic ferrules comprising the steps of forming an inner ferrule terminating in a coaxial nut, inserting a screw therein having a head adapted to fit the outer ferrule, thereafter telescoping said ferrules and fixing said head in the outer ferrule, cementing a plug in the hollow end of a pole section, placing a fluid cement in the open end of the inner ferrule and forcing the pole section therein whereby cement will be forced between the section and ferrule and out of the open end thereof.

7. The method of making a fishing pole joint having telescopic ferrules comprising the steps of forming an inner ferrule terminating in a coaxial nut, inserting a screw therein having a head adapted to fit the outer ferrule, thereafter telescoping said ferrules and fixing said head in the outer ferrule, placing a fluid cement in the open end of the inner ferrule, forcing a pole section therein whereby cement will be forced between the section and ferrule and out of the open end thereof, and thereafter passing a rivet through the inner ferrule and the section inserted therein.

WALTER R. PARRISH.

REFERENCES CITED

The following references are of record in the file of this patent:

UNITED STATES PATENTS

| Number | Name | Date |
| --- | --- | --- |
| 100,895 | Hubbard | Mar. 15, 1870 |
| 276,660 | Birch | May 1, 1883 |
| 1,162,855 | Goetz | Dec. 7, 1915 |
| 1,357,714 | Lane | Nov. 2, 1920 |
| 1,485,512 | Cocq | Mar. 4, 1924 |
| 1,591,121 | Gephart | July 6, 1926 |
| 1,634,082 | Rigby | June 28, 1927 |
| 2,088,470 | Freedlander | July 27, 1937 |
| 2,317,818 | Skulkety | Apr. 27, 1943 |

FOREIGN PATENTS

| Number | Country | Date |
| --- | --- | --- |
| 9,848 | Sweden | Nov. 23, 1897 |
| 415,383 | France | Sept. 24, 1910 |
| 545,887 | Great Britain | June 17, 1942 |